(No Model.)

L. M. REED.
BELT FASTENER.

No. 355,841. Patented Jan. 11, 1887.

WITNESSES
N. S. Amstutz
Geo. W. King

Lemon M. Reed, INVENTOR
By Leggett & Leggett
Attorneys

UNITED STATES PATENT OFFICE.

LEMON M. REED, OF CLEVELAND, OHIO.

BELT-FASTENER.

SPECIFICATION forming part of Letters Patent No. 355,841, dated January 11, 1887.

Application filed July 16, 1886. Serial No. 208,179. (No model.)

*To all whom it may concern:*

Be it known that I, LEMON M. REED, of Cleveland, in the county of Cuyahoga and State of Ohio, have invented certain new and useful Improvements in Belt-Fasteners; and I do hereby declare the following to be a full, clear, and exact description of the invention, such as will enable others skilled in the art to which it pertains to make and use the same.

My invention relates to improvements in belt-fasteners; and it consists in certain features of construction and in combination of parts, hereinafter described, and pointed out in the claims.

Figure 1:
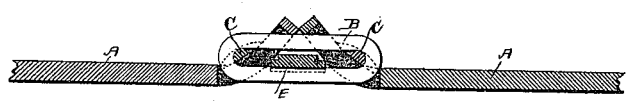
Figure 2:
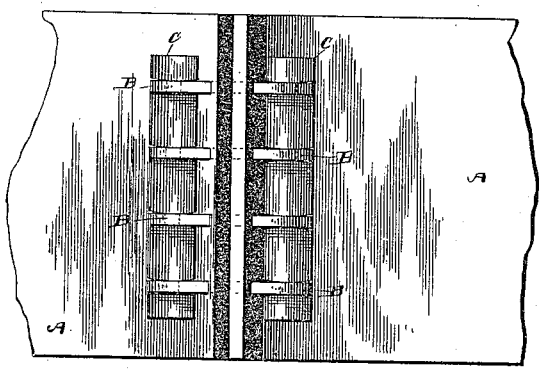
Figure 3:
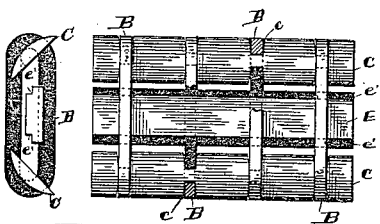
Figure 4:
Figure 6:
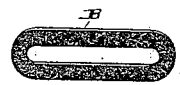
Figure 5:
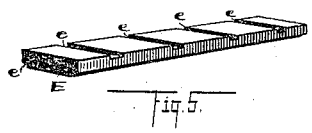

In the accompanying drawings, Figure 1 is an elevation in section lengthwise of the belt. Fig. 2 is a plan view. Fig. 3 is a plan of the fastener with the parts in position, the belt being omitted. Fig. 4 is a view in perspective of the locking-bar. Fig. 5 is a view in perspective of the pressure-bar in an inverted position. Fig. 6 is a side elevation of a belt-link.

A represents the belt, the ends of which are cut square in the usual manner.

B are open links, made substantially of the form shown. The ends of the links pass through suitable holes or slits made in the respective parts of the belt near the ends thereof, said holes being made at equal intervals and to correspond with the lateral grooves $c$ and $e$ made, respectively, in the bars C and E. The locking-bars C are flat on the under side that engages the belt, and convex on the top side, with grooves $c$ running across the upper surface, said grooves being made of suitable width to receive the upper member of the link B edgewise. The parts of the bar C at the bottom of the respective slots $c$ are rounded in cross-section to fit inside the links at the ends of the latter.

The links and bars C when in position, the former passing through the holes in the belt and the latter passing through the links on the outside of the belt, mutually lock and hold each other in position, the bars holding the links from withdrawing from the belt, and the links, by means of the slot $c$, holding the bars C from moving endwise through the links.

With the links and bars arranged as described the upper edges of the links would be drawn so hard against the under side of the belt that the latter would be injured thereby, to prevent which I provide the pressure-bar E, the same being rectangular in section and of sufficient thickness to enter the slots in the links. The under side of the bar E—that is, the side farthest from the belt—is grooved transversely at $e$ to fit over the lower members of the links, and the upper outer edges that engage the belt are grooved or channeled lengthwise, as shown at $e'$, and consequently made thinner thereby, by which arrangement the edges of the bar E are made, respectively, to engage the belt on two lines, and consequently are not pressed so far into the belt as would be the case if the corners were not channeled. In connecting the belt with my improved fastener the two ends thereof are usually laid the one upon the other, in which position the holes are punched and the links and bars C inserted. Next, the belt is spread apart and the bar E is placed in position, after which the belt is ready for use.

With the construction shown the belt is not worn or injured by the fastening, and is quite as strong at this as at other parts. There is no tendency to tear out the holes in the belt; in fact, the belt would hardly draw apart, being clamped above and below by the bars C and E, even if the holes for the links were slitted out to the adjacent ends of the belt. The parts are conveniently assembled or separated, and in less time than is required in lacing and unlacing a belt of the same size. The links are made longer or shorter according to the thickness of the belt, and of course the bars C and E are made of different lengths according to the different widths of belting.

What I claim is—

1. In a belt-fastener, the combination, with locking-bars and links arranged substantially as indicated, of pressure-bars made to operate inside the links and on the under side of the belt, said pressure-bars having transverse slots embracing the under member of the link and having channeled edges for engaging the belt, the parts being arranged substantially as described.

2. In a belt-fastener, the combination, with links adapted to pass through holes in the belt, of locking-bars, substantially as described, arranged to pass through the links outside of the belt, and pressure-bars adapted to pass through the links intermediate the locking-bars and engage the belt ends on the under side, substantially as set forth.

In testimony whereof I sign this specification, in the presence of two witnesses, this 7th day of July, 1886.

LEMON M. REED.

Witnesses:
 CHAS. H. DORER,
 ALBERT E. LYNCH.